C. H. LOGAN,
COTTON BOLL WEEVIL SUPPRESSOR AND RUBBISH BURYING ATTACHMENT FOR TURNING PLOWS.
APPLICATION FILED AUG. 30, 1917.
1,264,101.
Patented Apr. 23, 1918.
2 SHEETS—SHEET 1.
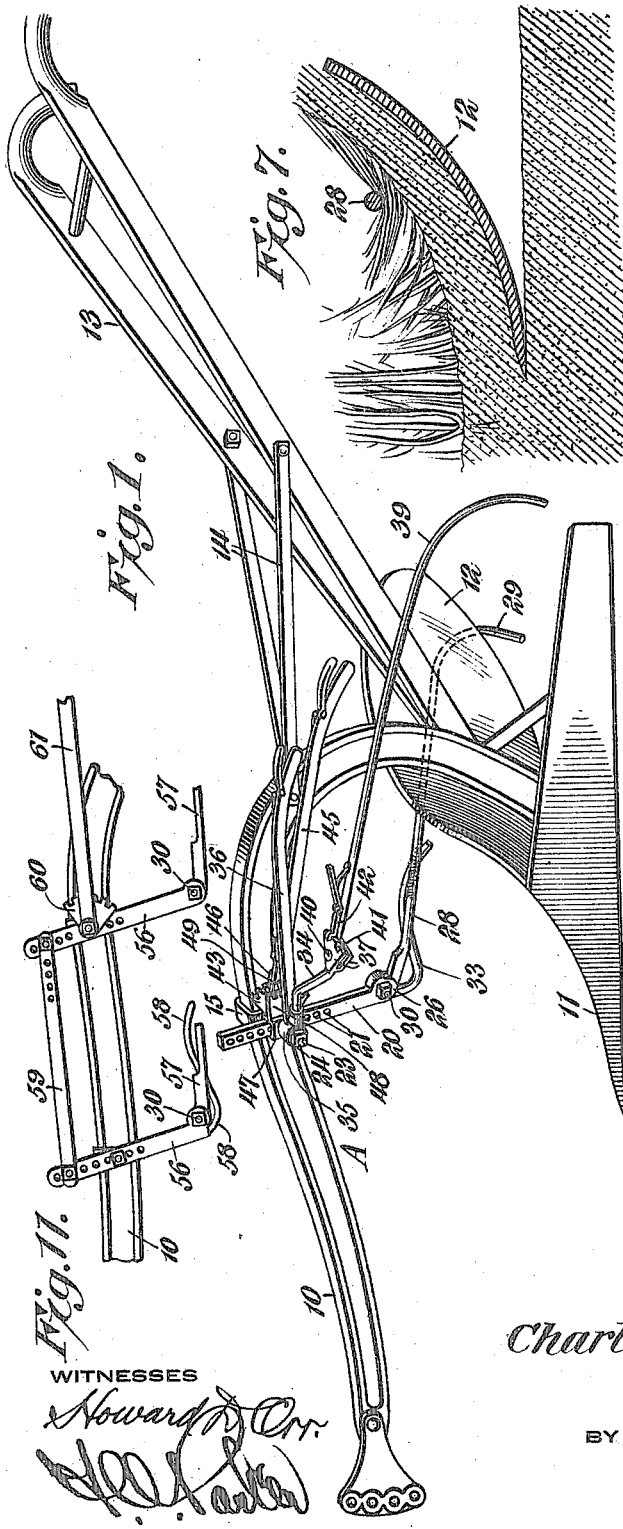
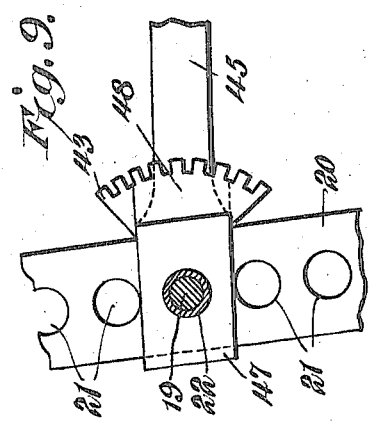
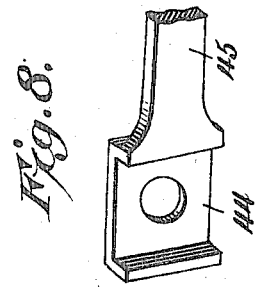
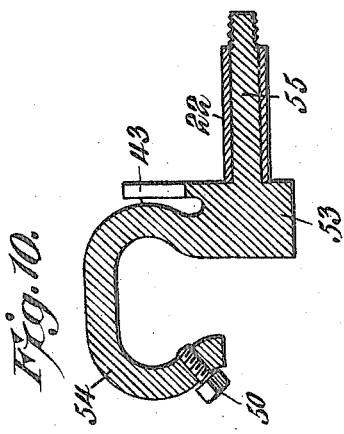
Charles H. Logan, INVENTOR,
WITNESSES
BY
ATTORNEY

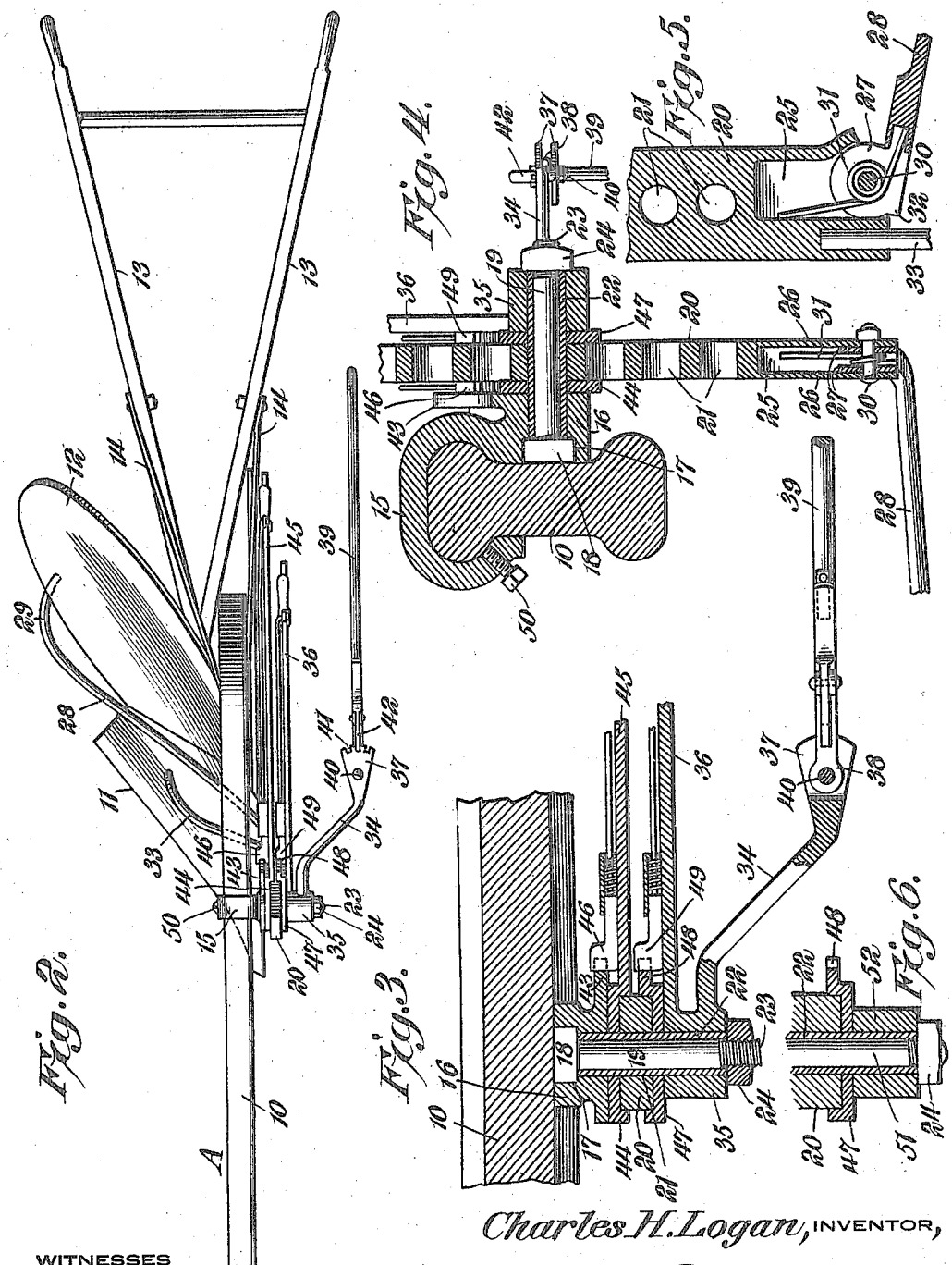

UNITED STATES PATENT OFFICE.

CHARLES H. LOGAN, OF SEDALIA, MISSOURI.

COTTON-BOLL-WEEVIL SUPPRESSOR AND RUBBISH-BURYING ATTACHMENT FOR TURNING-PLOWS.

1,264,101.   Specification of Letters Patent.   Patented Apr. 23, 1918.

Application filed August 30, 1917.   Serial No. 188,962.

*To all whom it may concern:*

Be it known that I, CHARLES H. LOGAN, a citizen of the United States, residing at Sedalia in the county of Pettis and State of Missouri, have invented new and useful Cotton-Boll-Weevil Suppressors and Rubbish-Burying Attachments for Turning-Plows, of which the following is a specification.

The invention relates to a plow attachment and more particularly to a cotton boll weevil suppressor and a rubbish burying device.

The primary object of the invention is the provision of an attachment of this character, wherein the same may be detachably mounted upon the beam of the plow so that rubbish on both sides of said plow will be acted upon to straighten the fallen corn stalks, stubble, weeds, and the like at the land side to be buried in the furrows on the closing thereof, while the rubbish at the furrow side of the plow will be turned under the broken earth to be buried into the furrow closed thereby on the advancement of the plow, the attachment also being designed to destroy cotton boll weevil.

Another object of the invention is the provision of an attachment of this character, wherein the rubbish arms are mounted in a novel manner so that the same can be readily adjusted simultaneously with each other for the lifting thereof to inoperative position when it is desired to turn the plow or to transfer it from one field to another, or while the plow is inactive, one of the arms being adjustable independently of the other whereby the stalks, stubble, weeds, or other obstructions, will be properly turned during the plowing operation for the complete burying thereof in the furrow by the closing thereof with the broken soil in the plowing operation without regard to the depth of the plowing.

A further object of the invention is the provision of an attachment of this character, wherein one of the rubbish turning arms is augmented by an advanced rigid arm which acts upon the heavier standing rubbish so as to knock down the same and thereby relieve the resistance thereof from the trailing arm which automatically works to turn the rubbish in the direction of the falling soil broken by the plow for the complete burying thereof in the furrow closed by the broken earth, the trailing arm being susceptible of the desired flexibility for continuously exerting a downward pressure against the rubbish and also to accommodate itself to any sidewise movement of the plow.

A still further object of the invention is the provision of an attachment of this character, wherein the mounting of the arms permits the use thereof with a plow for action upon rubbish at both sides of the latter or at one side thereof, the arms being adjustable to various positions to insure the perfect working of the attachment in conjunction with the plow when advanced through a field for the straightening of fallen rubbish and a complete burying of both the standing and fallen rubbish in the bottom of the furrow.

A still further object of the invention is the provision of an attachment of this character which is comparatively simple in construction, readily and easily applied to and removed from the plow, easy of adjustment, thoroughly reliable and efficient in its operation, strong, durable, and inexpensive in manufacture.

Other objects will be in part obvious and in part hereinafter pointed out.

The invention accordingly consists in the features of construction, combination and arrangement of parts, the construction of which will be exemplified in the following detailed description and the scope of the application of which will be indicated in the appended claims. However, it is to be understood that changes, variations and modifications may be made in the invention, such as come properly within the scope of the appended claims without departing from the spirit of the invention or sacrificing any of its advantages.

In the accompanying drawings:—

Figure 1 is a perspective view of a turning plow showing the attachment, constructed in accordance with the invention, applied.

Fig. 2 is a top plan view thereof.

Fig. 3 is an enlarged fragmentary horizontal sectional view through the attachment.

Fig. 4 is an enlarged vertical transverse sectional view thereof.

Fig. 5 is a fragmentary vertical sectional view through the adjustable hanger post showing in detail the flexible connection of one of the rubbish turning arms.

Fig. 6 is a fragmentary horizontal sectional view showing a slight modification.

Fig. 7 is a vertical sectional view through the plow share showing the same opening a furrow with one of the rubbish turning arms in position relative to the broken soil and rubbish, indicative of the turning down of said rubbish.

Fig. 8 is a fragmentary perspective view of one of the throw levers.

Fig. 9 is a fragmentary side elevation of the hanger post showing the stub spindle in section and the lever latch segments.

Fig. 10 is a vertical transverse sectional view showing a slight modification of plow beam clamp for the attachment.

Fig. 11 is a fragmentary side elevation of the plow beam showing a modified form of the attachment with advance and trailing rubbish turning arms in series and operable from a single lever.

Similar reference characters indicate corresponding parts throughout the several views in the drawings.

Referring to the drawings in detail, particularly Figs. 1 and 2, there is shown for illustrative purposes a turning plow A including the usual plow beam 10, the share 11, the moldboard 12, and the handle bars 13, the share 11 and moldboard 12 being connected to the foot or frog of the plow beam 10 in the usual well known manner, while the handle bars 13 have connected thereto and to the beam 10 the braces 14, these parts of the plow A forming no part of the present invention, and on the beam 10 is connected the attachment hereinafter fully described.

The attachment comprises a clamp forming a yoke 15 which is adapted to embrace the upper beaded edge of the beam 10 of the plow and at one side of this yoke is a bearing 16 which in the inner face is formed with a counterseat 17 to receive the head 18 of a bolt-like stub spindle 19 which is passed through a suitable opening in the bearing 16 to project from one side of the clamp. Adjustably and detachably supported upon the stub spindle 19 is a hanger post 20 which is formed at intervals with holes 21 in any one of which is adapted to be received the stub spindle 19 for the vertical adjustment of the hanger post 20, as will be obvious. Surrounding the stub spindle 19 is a spacing bushing 22, the outer end of the stub spindle being formed with a screw thread 23 for the connection of a nut 24 therewith which works against the spacing bushing 22, to prevent the turning loose of the nut, and holding the parts on the spindle freely rotatable as is clearly shown in Fig. 4 of the drawings.

Formed in the lower end of the hanger post 20 is a recess 25 providing spaced side ears 26 between which is arranged the pivot eye terminal 27 of a rubbish turning arm 28 which is bent laterally in a rearward direction to extend diagonally and downwardly forwardly of the moldboard 12, the free end of the arm 28 being downwardly and inwardly curved to provide a tip or finger 29 which is adapted to engage in the open furrow and contact with the bottom thereof on the advancement of the plow. Passed through the ears 26 at the lower end of the hanger post 20 and the eye terminal 27 of the arm 28 is a pivot 30 which swingingly connects the arm 28 to the post 20 for the vertical flexible movement of said arm 28, the pivot 30 being suitably fitted with a tension spring 31 which has one end playing against the wall of the recess 25 in the post 20 and its opposite end engaged in any suitable manner with the arm so as to exert a constant tension thereon for the continuous pressing of the arm 28 downwardly toward the soil. The terminal eye 27 of the arm 28 at a suitable point is formed with a stop 32 which limits the downward movement of said arm and thus holding the same in normal working position.

Carried by the post 20 and extending forwardly in the direction of the moldboard side of the plow, with respect to the arm 28, is a rigid horn or arm 33 which is rearwardly directed and is designed to knock down or turn over rigid standing rubbish so as to relieve pressure thereof, when standing, upon the arm 28, which acts upon all the rubbish at the furrow side of the plow for the turning thereof, with the soil during the plowing operation for the complete burying of the rubbish in the bottom of the furrow on the closing thereof by the broken soil when the plow is advanced through the field.

Mounted on the spindle 19 at the outer side of the post 20 is a bracket 34 which is bent into elbow shape laterally for the offsetting of its ends relative to each other. One end of the bracket 34 is formed with a collar or sleeve 35 which loosely embraces the spacing bushing 22 on the spindle 19, and this collar or sleeve has integrally formed therewith an operating lever 36 which extends rearwardly in convenient reach of the operator of the plow, while the other end of the bracket 34 is bifurcated to provide spaced substantially segment shaped ears 37 for receiving therebetween the pivot end 38 of a rubbish straightening arm 39, the end 38 being engaged with a pivot 40 which is secured in the ears 37, the uppermost ear 37 being formed with teeth 41 with which engages a spring held latch 42 pivoted upon the arm 39 so that said arm can be adjusted laterally with respect to the line of draft of the plow and locked in its adjusted position, thereby regulating the straightening of the fallen rubbish at any desired distance from the plow on the land side thereof.

Integrally formed with the bearing 16 of the clamp is a toothed segment 43, while engaged about the spacing bushing 22 and the spindle 19 between the bearing 16 and the hanger post 20 is the jaw end 44 of an operating lever 45, the jaw end 44 being engaged with the post 20, so that on moving the lever 45 the post will be rocked on the spindle 19 for the raising and lowering of the arm 28 in the vertical adjustment thereof. Carried by the operating lever 45 is the usual hand released spring held latch dog 46 which engages with the segment 43 to lock the lever in its adjusted position.

Arranged between the post 20 and the collar or sleeve end 35 of the bracket 34 is the jaw portion 47 of a rearwardly extended toothed segment 48, the jaw portion 47 embracing the post 20, while mounted on the lever 36 is the hand released spring held latching pawl or dog 49 which engages the toothed segment 48 for locking the lever 36 in adjusted position.

The jaw portions 44 of the lever 45, and 47 of the segment 48 embracing the hanger post 20 permits the simultaneous adjustment of the arms 28 and 39 on operating the lever 45; while the lever 36 will raise and lower the arm 39 independently of the arm 28 and it can be locked in its adjusted position, while likewise the lever 45 can be locked in adjusted position. It will be seen that by the arrangement of the levers 36 and 45 they can be manually operated for either raising both of the arms 28 and 39 or lowering the same simultaneously with each other at the fancy of the user of the plow; or the arm 39 can be raised independently of the arm 28 by actuating the lever 36.

When the arms 28 and 39 are in lowered position at opposite sides of the plow and in working relation to the ground, the same will operate in conjunction with the plowing operation so that the arm 39 on the land side of the plow will straighten fallen rubbish to be subsequently buried in a furrow on the closing thereof with the broken earth, while the arm 28, together with the horn 33, will knock down and turn under the rubbish at the furrow side of the plow for the burying of said rubbish within the furrow closed by the broken soil during the advancement of said plow, that is to say, the rubbish at the furrow side will be turned down into the furrow directly in advance of the broken soil which is deposited thereon for the complete burying of the rubbish.

The clamp having the yoke 15 engaged on the beam 10 of the plow is readily adjustable either forwardly or backwardly thereon so as to properly position the arm 28 relative to the plow share 11 and its moldboard 12 accordingly to the depth of the cut thereof, so that the arm 28 will operate to turn down the rubbish for the successful burying thereof in a manner as hereinbefore set forth. The yoke 15 has tapped therein a set screw 50 for securing the clamp in its adjusted position on the plow beam.

In Fig. 6 of the drawings there is shown a slight modification wherein the bolt-like spindle 51 is of a length corresponding to the spindle 19, which is a substitute for the bracket 34 having the collar or sleeve terminal 35 when there is employed a washer or block 52 when the bracket 34 with its arm 35 is removed or in disuse. It will be seen that by the use of this washer or block 52 the parts shown in Fig. 3 of the drawings can be used and will remain the same on discarding the bracket 34 and the arm 39 carried thereby, which necessity sometimes demands in working certain soils and the character and volume of the rubbish.

The attachment contemplates in the use thereof the employment of the arm 28 independently of the arm 39 or both of the same and this use is at the option of the user.

In Fig. 10 of the drawings there is shown a slight modification of clamp wherein the bearing 53 at one end of the yoke 54 has integrally formed therewith the spindle 55; otherwise this clamp is identically the same as the clamp hereinbefore described.

In Fig. 11 of the drawings there is shown a modification of the attachment wherein the same comprises multiple hanger posts 56 arranged one in advance of the other and are clamped for vertical adjustment and for swinging movement upon the plow beam in a manner similar to the post 20 hereinbefore described. Each post 56 carries the flexible rubbish turning arm 57 which is identical to the arm 28 hereinbefore described. On the forward post 56 is carried the rigid horn 58 which is identical to the horn 33 hereinbefore described. Connecting the posts 56 is an adjustable tie or union rod 59 which serves to join the said posts for movement thereof in unison with each other, and the same can be adjusted toward or away from each other as will be obvious. On the clamp for the rearmost post 56 is a toothed segment 60, while operating upon said rearmost post 56 is a throw lever 61 corresponding to the lever 45 and carries a suitable spring-held latch for engagement with the toothed segment 60 to lock the lever 61 in adjusted position and through the instrumentality of this lever the hanger post 56 can be swung vertically for the raising and lowering of the rubbish turning arms 57, as will be apparent.

The idea of employing a plurality of rubbish turning arms 57, as shown in Fig. 11, one in advance of the other, is to turn down voluminous rubbish which is too heavy and bulky for the use of a single arm.

It is of course to be understood that the attachment may be used with a single arm at the furrow side or with both arms at the furrow and land sides, or with a multiple of arms, at the option of the user.

By reason of the construction of the bearing 16 on the yoke 15 of the clamp, it will be apparent that different lengths of bolt-like spindles 19 can be employed, and the head 18 of said spindle 19 being engaged in the recess or counterseat 17 prevents any possibility of the turning of the spindle 19 in the bearing while the bushing 22 avoids the nut 24 turning upon the spindle 19 resultant from the vertical adjustment of the arms 28 and 39 and also the adjustment of the hanger post 20 upon said spindle, thereby avoiding any lost motion in the parts when moved and in the event that lost motion occurs a new bushing may be substituted.

The attachment is adaptable for either a left hand or a right hand plow, and the same is shown in Figs. 1, 2, 3 and 4 as applied to a right hand plow, so to use the same on a left hand plow parts are reversed, as will be apparent.

In the use of the attachment by reason of the fact that the same operates upon the rubbish to completely bury it, the cotton boll weevil is deprived of food so that such boll weevil is destroyed before hibernating.

From the foregoing it is thought that the construction, manner of application, and the operation of the attachment will be clearly understood, and, therefore, a more extended explanation has been omitted.

What is claimed is:

1. The combination with a turning plow, of an attachment for suppressing cotton boll weevil comprising a clamp for adjustable connection with the plow beam, a rubbish turning arm adjustably connected with the clamp and projecting laterally and rearwardly in advance of the mold board of the plow, and having a downwardly and inwardly directed terminal for engagement in an open furrow, and means for raising and lowering the arm.

2. The combination with a turning plow, of an attachment for suppressing cotton boll weevil comprising a clamp for adjustable connection with the plow beam, a rubbish turning arm adjustably connected with the clamp and projecting laterally and rearwardly in advance of the mold board of the plow, and having a downwardly and inwardly directed terminal for engagement in an open furrow, means for raising and lowering the arm, means for permitting the flexing of the arm, and means active upon the arm for exerting a downward pressure thereon.

3. The combination with a turning plow, of an attachment for suppressing cotton boll weevil comprising a clamp for adjustable connection with the plow beam, a rubbish turning arm connected with the clamp and projecting laterally and rearwardly in advance of the mold board of the plow, and having a downwardly and inwardly directed terminal for engagement in an open furrow, and a rigid horn also adjustably connected with the clamp and extending laterally and rearwardly in advance of said arm.

4. The combination with a turning plow, of an attachment comprising a clamp for adjustable connection with the plow beam, a rubbish turning arm connected with the clamp and projecting laterally and rearwardly in advance of the mold board of the plow, and having a downwardly and inwardly directed terminal for engagement in an open furrow and a second arm adjustably supported on the clamp and disposed at the land side of the plow.

5. The combination with a turning plow, of an attachment comprising a clamp for adjustable connection with the plow beam, a rubbish turning arm connected with the clamp and projecting laterally and rearwardly in advance of the mold board of the plow, and having a downwardly and inwardly directed terminal for engagement in an open furrow, means for raising and lowering the arm, a second arm adjustably supported on the clamp and disposed at the land side of the plow, and means for vertically adjusting the second arm independently of the adjustment of the first arm.

6. The combination with a turning plow, of an attachment comprising a clamp for adjustable connection with the plow beam, a rubbish turning arm connected with the clamp and projecting laterally and rearwardly in advance of the mold board of the plow, and having a downwardly and inwardly directed terminal for engagement in an open furrow, means for raising and lowering the arm, a second arm adjustably supported on the clamp and disposed at the land side of the plow, means for vertically adjusting the second arm independent of the adjustment of the first arm, and means for laterally adjusting the second arm.

7. The combination with a turning plow, of an attachment comprising a clamp for adjustable connection with the plow beam, a rubbish turning arm connected with the clamp and projecting laterally and rearwardly in advance of the mold board of the plow, and having a downwardly and inwardly directed terminal for engagement in an open furrow, a second arm adjustably supported on the clamp and disposed at the land side of the plow, means for vertically adjusting the second arm independent of the adjustment of the first arm, means for laterally adjusting the second arm, and cooperating parts between the means for vertically adjusting the second arm and the means for vertically adjusting the first arm to permit the vertical adjustment of both arms together on operating the vertically adjustable means for the first arm.

8. The combination with a plow, of a clamp adjustably and detachably connected with the beam of the plow, a spindle projecting from one side of the clamp, a hanger post adjustably connected with the spindle, a lever for turning the hanger on said spindle, a rubbish turning arm pivotally connected to the lower end of the hanger, and projecting laterally and rearwardly in advance of the mold board of the plow, and means active upon the arm for exerting a pressure thereon downward in the direction of the ground.

9. The combination with a plow, of a clamp adjustably and detachably connected with the beam of the plow, a spindle projecting from one side of the clamp, a hanger post adjustably connected with the spindle, a lever for turning the hanger on said spindle, a rubbish turning arm pivotally connected to the lower end of the hanger and projecting laterally and rearwardly in advance of the mold board of the plow, means active upon the arm for exerting a pressure thereon downward in the direction of the ground, a toothed segment formed on the clamp, and a latch carried by said first named means and adjustably engaging the segment.

10. The combination with a plow, of a clamp adjustably and detachably connected with the beam of the plow, a spindle projecting from one side of the clamp, a hanger post adjustably connected with the spindle, a lever for turning the hanger on said spindle, a rubbish turning arm pivotally connected to the lower end of the hanger and projecting laterally and rearwardly in advance of the mold board of the plow, means active upon the arm for exerting a pressure thereon downward in the direction of the ground, a toothed segment formed on the clamp, a latch carried by said first named means and adjustably engaging the segment, a downwardly and inwardly extending finger at the end of the arm to engage in an open furrow, means for fastening the clamp in adjusted position on the plow beam, a rigid horn on the hanger and extending laterally and rearwardly in advance of the arm.

11. The combination with a plow, of a clamp adjustably and detachably connected with the beam of the plow, a spindle projecting from one side of the clamp, a hanger post connected with the spindle, a lever for turning the hanger on said spindle, a rubbish turning arm pivotally connected to the lower end of the hanger and projecting laterally and rearwardly in advance of the mold board of the plow, a downwardly and inwardly extending finger at the end of the arm to engage in an open furrow, means for fastening the clamp in adjusted position on the plow beam, a fixed bracket adjustably mounted on the spindle, a second arm carried by said bracket, and extending rearwardly at the land side of the plow, means for adjusting the bracket independently of the hanger, and means for laterally adjusting the second arm.

12. The combination with a plow, of a clamp adjustably and detachably connected with the beam of the plow, a spindle projecting from one side of the clamp, a hanger post connected with the spindle, a lever for turning the hanger on said spindle, a rubbish turning arm pivotally connected to the lower end of the hanger and projecting laterally and rearwardly in advance of the mold board of the plow, a downwardly and inwardly extending finger at the end of the arm to engage in an open furrow, means for fastening the clamp in adjusted position on the plow beam, a fixed bracket adjustably mounted on the spindle, a second arm carried by said bracket, and extending rearwardly at the land side of the plow, means for adjusting the bracket independently of the hanger, means for laterally adjusting the second arm, and means active between the means for adjusting the hanger and the means for adjusting the second arm, whereby both arms will be vertically adjusted on operating the first named means.

13. The combination with a plow, of an attachment comprising a clamp for engaging the beam of the plow, a set screw carried by the clamp for locking the same in adjusted position on the beam, a spindle on said clamp and projecting from one side thereof, a hanger vertically adjustable on the spindle, a toothed segment formed on the clamp, a lever swingingly connected to the spindle and engaging the hanger, a latch carried by the lever and engaging the segment for locking the lever in adjusted position, and a rubbish turning arm flexibly connected with the hanger and extending laterally and rearwardly in advance of the mold board of the plow, and having a downwardly and inwardly curved end to engage in an open furrow.

14. The combination with a plow, of an attachment comprising a clamp for engaging the beam of the plow, means carried by the clamp for locking the same in adjusted position on the beam, a spindle on said clamp and projecting from one side thereof, a hanger adjustable on the spindle, a lever swingingly connected to the spindle and engaging the hanger, means for locking the lever in adjusted position, a rubbish turning arm flexibly connected with the hanger and extending laterally and rearwardly in advance of the mold board of the plow, a bracket connected with the spindle for vertical swinging movement, a lever provided on the bracket, a second arm connected with the bracket and extending rearwardly at the land side of the plow, having a jaw engaged on the spindle and embracing the hanger, and a latch carried by the second lever and engaging the last named segment for locking the bracket in adjusted position independently of the hanger, the first lever being designed to adjust both arms simultaneously with each other, and independently of the second lever.

15. The combination with a turning plow, of a rubbish turning arm projecting laterally and rearwardly in advance of the moldboard of the plow, and having a downwardly and inwardly directed terminal for engagement in an open furrow, a second arm disposed at the opposite side of the plow so as to run on the land, means for coupling the two arms together and adjustably fastening the same to the beam of the plow, and means for vertically adjusting the second arm independently of the first-mentioned arm.

16. The combination with a turning plow, of a rubbish turning arm projecting laterally and rearwardly in advance of the moldboard of the plow and having a downwardly and inwardly directed terminal for engagement in an open furrow, a second arm disposed at the opposite side of the plow so as to run on the land, means for coupling the two arms together and adjustably fastening the same to the beam of the plow, means for raising and lowering the first-mentioned arm, and means for vertically adjusting the second arm independently of the adjustment of the first arm, the two arms moving together upon the operation of the means for raising and lowering the first arm.

In testimony, that I claim the foregoing as my own, I have hereto affixed my signature in the presence of two witnesses.

CHARLES H. LOGAN.

Witnesses:
EDNA JAMES SHEEHY,
H. C. PARKER.